(12) United States Patent
Ariyoshi (10) Patent No.: US 6,408,288 B1
(45) Date of Patent: Jun. 18, 2002

(54) INFORMATION FILTERING METHOD AND DEVICE, AND STORAGE MEDIUM STORING INFORMATION FILTERING PROGRAM

(75) Inventor: Yusuke Ariyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/028,572

(22) Filed: Feb. 24, 1998

(30) Foreign Application Priority Data

Feb. 24, 1997 (JP) .............................................. 9-038696

(51) Int. Cl.$^7$ ............................. G06E 3/00; G06F 17/30

(52) U.S. Cl. ................................ 706/22; 707/1; 707/10

(58) Field of Search ................................ 706/22; 707/1, 707/10

(56) References Cited

U.S. PATENT DOCUMENTS 5,867,799 A * 2/1999 Lang et al. ..................... 707/1

FOREIGN PATENT DOCUMENTS

| EP | 0751471 | 1/1997 |
|----|---------|--------|
| JP | 3- 94375 | 4/1991 |
| WO | 95 29452 | 11/1995 |

OTHER PUBLICATIONS

Douglas B. Terry, "Replication in an Information Filtering System", Second Workshop on the Management of Replicated Data, IEEE, Nov. 1992.

Hiraiwa et al, "Info–Plaza: A Social Information Filter System for the World–Wide Web", IEEE Proceedings of Inter. Conf. on Parallel and Distributed Systems, Jun. 1996.

Morita et al, "Information Filtering Based on User Behavior Analysis and Best Match Text Retrieval", Proceedings of the Seventeenth Annual International ACM—SIGIR Conference on Research and Development in Information retrieval, Jul. 1994.

Ackerman et al," Social Activity Indicators—Interface components for CSCW Systems", Proceedings of the 8th ACM Symposium on User Interface and Software Technology, Nov. 1995.

Upendra Shardanand et al., "Social Information Filtering: Algorithms for Automating "Word of Mouth"", *CHI '95 Proceedings*, 1995, pp. 1–10.

Paul Resnick et al., "GroupLens: An Open Architecture for Collaborative Filtering of Netnews", *ACM*, 1994, pp. 175–186.

(List continued on next page.)

*Primary Examiner*—George B. Davis
(74) *Attorney, Agent, or Firm*—Sughrue Mion, PLLC (57) ABSTRACT

In an information filtering method, attributes included in information items are extracted and stored, and ratings relative to the information items carried out by users are stored. The users include a subject user and other users. A relationship between the ratings relative to the information items rated by the subject user and the attributes thereof and a relationship between the ratings relative to the information items rated by the other users and the attributes thereof are utilized for estimating relevances to the subject user of the information items not rated by the subject user. The estimated relevances are used to carry out recommendation or filtering-in of the information item which matches with the subject user.

10 Claims, 9 Drawing Sheets

OTHER PUBLICATIONS

D. Goldberg et al., "Using Collaborative Filtering To Weave An Information Tapestry", Communication of the Association for Computing Machinery, vol. 35, No. 12, Dec. 1, 1992, pp. 61–69.

P. Resnick et al., "GROUPLENS: An Open Architecture For Collaborative Filtering Of Netnews", Proceedings of Conference on Computer–Supported Cooperative Work, Oct. 22, 1994, pp. 175–186.

N. Shibata et al., "Network Trend Watcher", NEC Giho, vol. 49, No. 7, Jul. 30, 1996, pp. 24–27.

H. Nomiyama et al., "Personalized Information Navigator: the Hierarchical Memory Model for Learning User's Interests and Its Application to Collaborative Filtering", vol. 96, No. 70, Jul. 25, 1996, pp. 49–56.

K. Miyahara et al., "Representation of Personal Information Interests and its Acquisition Method for Collaborative Filtering", IEICE Technical Report, vol. 96, No. 453, Jan. 22, 1997, pp. 15–22.

* cited by examiner

INFORMATION FILTERING METHOD AND DEVICE, AND STORAGE MEDIUM STORING INFORMATION FILTERING PROGRAM

BACKGROUND OF THE INVENTION

The present invention relates to an information filtering method, an information filtering device and a storage medium storing an information filtering program, for carrying out recommendation or filtering of information according to a user's interest or taste from an information system, such as database or the WWW (world wide web).

Information filtering methods and devices, and information filtering programs (hereinafter collectively referred to as "information filtering systems") have been used to carry out recommendation or filtering-in of information or services matching with interests or tastes of users from among a large amount of information or a large number of services (hereinafter collectively referred to as "information") offered by an information system, such as database, personal computer communication or the WWW.

In the conventional information filtering systems, there have been known two kinds of systems, that is, the CBF (content based filtering) system and the SIF (social information filtering) system.

In the CBF system, the contents of items of information are featured by data, such as keywords or frequencies of words contained in the respective information items (hereinafter such data will be referred to as "attributes"), and the information filtering is performed based on comparison between the foregoing featured contents and interests of a user shown in the past and represented by weights of keywords or the like.

On the other hand, in the SIF system, data about ratings of information items carried out by users (hereinafter such data will be referred to as "ratings") are stored, and the information filtering is performed by comparing the stored ratings of a subject user (a user requesting the information filtering) and the stored ratings of the users other than the subject user to find the user/users having similar taste with the subject user and by selecting the information item which has been evaluated high by the foregoing similar user/users, but not yet evaluated by the subject user.

Japanese First (unexamined) Patent Publication No. 3-94375 describes a document retrieval device as an example of the CBF system. On the other hand, as examples of the SIP system, a system called GroupLens is described in "proceedings of the cscw 1994" by acm press, 1994, pp. 175–186 and a system called Ringo is described in "proceedings of the chi95" by acm press, 1995, pp. 210–217.

Each of the CBF and the SIF will far later be described in detail in conjunction with the drawing.

In the CBF system, a relationship between attributes of information items, such as word frequencies, and ratings performed by the subject user is learned relative to information items which have been rated by the subject user, so as to find (filter in) information items which have not yet been rated by the subject user. On the other hand, in the foregoing SIF system, a relationship between the subject user and the users other than the subject user is learned from ratings carried out by the subject user and the other users relative to the information items so as to filter the information items which have not been rated by the subject user, but rated by the other users.

Specifically, the first problem of the CBF system resides in that, although information about what the user is interested in (that is, attributes such as keywords) can be obtained, it is necessary for the user to judge whether the information is valuable or not, by reading it. The reason is that the CBF system is a system based on the attributes of keywords or word frequencies and not based on personal evaluations as the SIF system.

The second problem of the CBF system resides in that the filtering accuracy is low relative to an information item having an unknown word or an unknown attribute value. The reason is that, in the CBF system, the relationship between the ratings by the subject user and the attributes of the information items is learned as the profile based on the rating history of the subject user and the attributes of the information items already rated by the subject user, and the relevances are estimated based on the learned profile. Accordingly, in the CBF system, if the information item has an unknown word or an unknown attribute value, how to reflect it upon the relevance is unknown.

On the other hand, the first problem of the SIF system resides in that only the information item that has been recommended or evaluated by the users can be obtained. The reason is that the SIF system is a system based on the recommendation or evaluation of the users so that only such a recommended or evaluated information item can be the subject of the filtering.

The second problem of the SIF system resides in that the filtering accuracy is low unless a certain number of ratings have been collected. The reason is that the SIF system is a system based on the recommendation or evaluation of the users.

SUMMARY OF THE INVENTION

It is therefore an object of the present invention to provide an information filtering system which is capable of reducing or eliminating the foregoing problems inherent in the conventional CBF and SIF systems and performing recommendation or filtering-in of information with higher filtering accuracy and with more agreement to a user's interest or taste.

Other objects of this invention will become clear as the description proceeds.

According to an aspect of the present invention, there is provided an information filtering method comprising the steps of obtaining attributes included in information items, obtaining ratings relative to the information items performed by users including a subject user and other users, estimating relevances to the subject user of the information items not rated by the subject user by the use of the ratings relative to the information items rated by the subject user, of the attributes of the information items rated by the subject user, of the ratings relative to the information items rated by the other users, and of the attributes of the information items rated by the other users, and carrying out recommendation or filtering-in for the subject user as regards the information items by the use of the relevances.

According to another aspect of the present invention, there is provided an information filtering method comprising first obtaining means for obtaining attributes included in information items, second obtaining means for obtaining ratings relative to the information items performed by users including a subject user and other users, estimating means connected to the first and the second obtaining means for estimating relevances to the subject user of the information items not rated by the subject user by the use of the ratings relative to the information items rated by the subject user, of the attributes of the information items rated by the subject user, of the ratings relative to the information items rated by the other users, and of the attributes of the information items rated by the other users, and carrying out means connected to the estimating means for carrying out recommendation or filtering-in for the subject user as regards the information items by the use of the relevances.

According to still another aspect of the present invention, there is provided a storage medium storing an information filtering program which is executable by a computer. The information filtering program allows the computer to execute the steps of extracting attributes included in information items and storing the attributes in a storage device of the computer, and storing ratings relative to the information items performed by users including a subject user and other users in the storage device; using a relationship between the ratings relative to the information items rated by the subject user and the attributes thereof and a relationship between the ratings relative to the information items rated by the other users and the attributes thereof so as to estimate relevances to the subject user of the information items not rated by the subject user; and using the relevances to carry out recommendation or filtering-in of the information item matching with the subject user.

According to yet another aspect of the present invention, there is provided a storage medium storing an information filtering program which is executable by a computer. The information filtering program allows the computer to function as: attribute extracting means for extracting attributes included in information items; attribute storing means for storing the extracted attributes; rating storing means for receiving inputs of rating values relative to the information items from users including a subject user and other users, and storing the received rating values; similarity deriving means for deriving, by referring to the rating storing means, similarities between the subject user and the other users based on the rating values inputted by the subject user relative to the information items and the rating values inputted by the other users relative to the information items; first relevance estimating means for estimating, based on the derived similarities, first relevances to the subject user of the information items not rated by the subject user among the information items rated by the other users; a user profile learning means for learning, by referring to the attribute storing means and the rating storing means, a relationship between the attributes included in the information items rated by the subject user and the ratings thereof, and further learning, based on the estimated first relevances, a relationship between the attributes included in the information items not rated by the subject user among the information items rated by the other users and the relevances thereof to the subject user; second relevance estimating means for estimating, based on the relationship between the attributes and the ratings and the relationship between the attributes and the relevances, second relevances to the subject user of the information items not rated by any of the subject user and the other users; and relevance unifying means for unifying the first and second relevances to carry out recommendation or filtering-in of the information item matching with the subject user.

DESCRIPTION OF THE PREFERRED EMBODIMENT

Now, conventional techniques according to the CBF system and the SIF system will be explained with reference to FIGS. 1 to 4.

Figure 1:
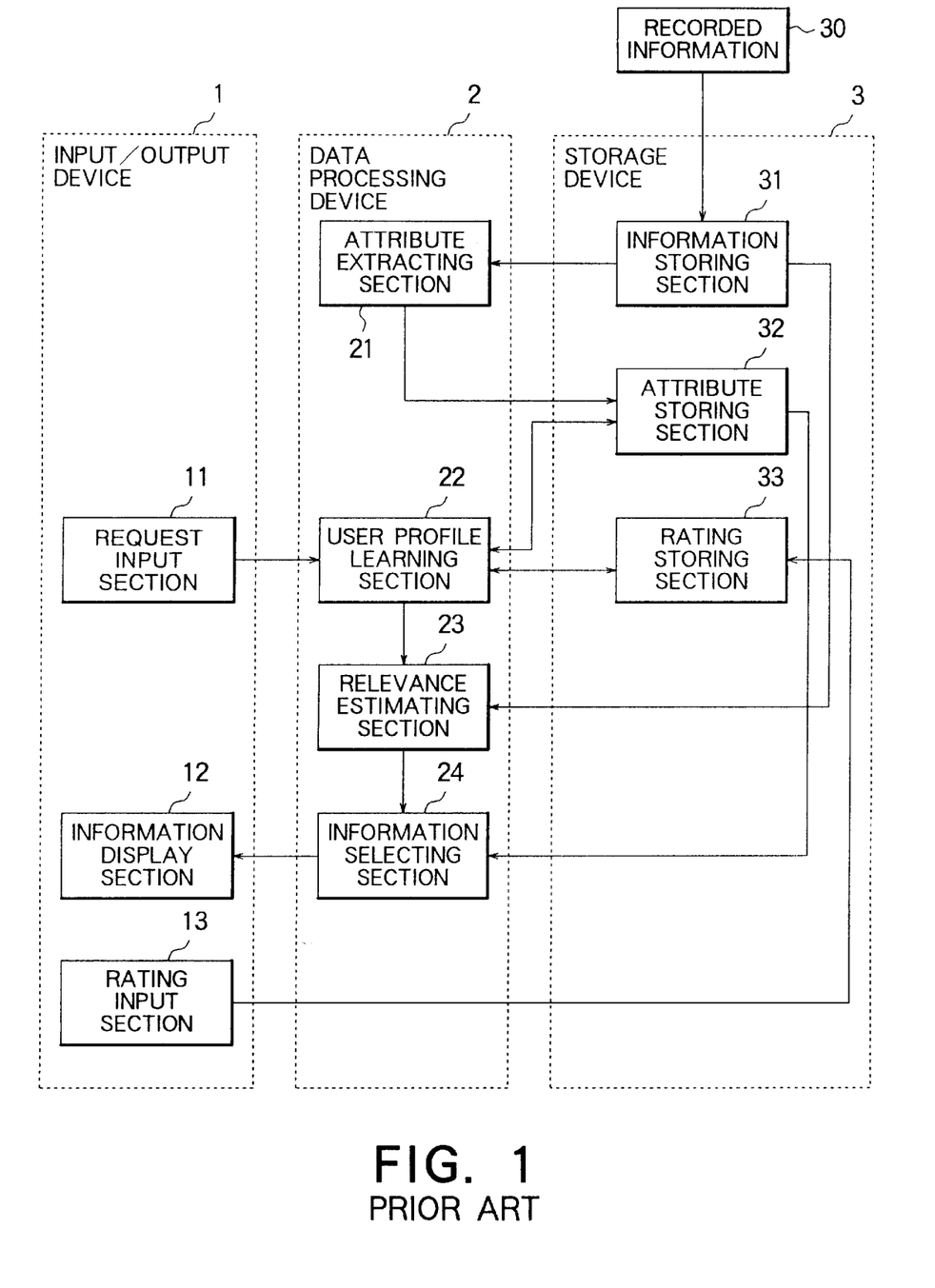
FIG. 1 is a block diagram showing a structure of a conventional CBF system.
Figure 2:
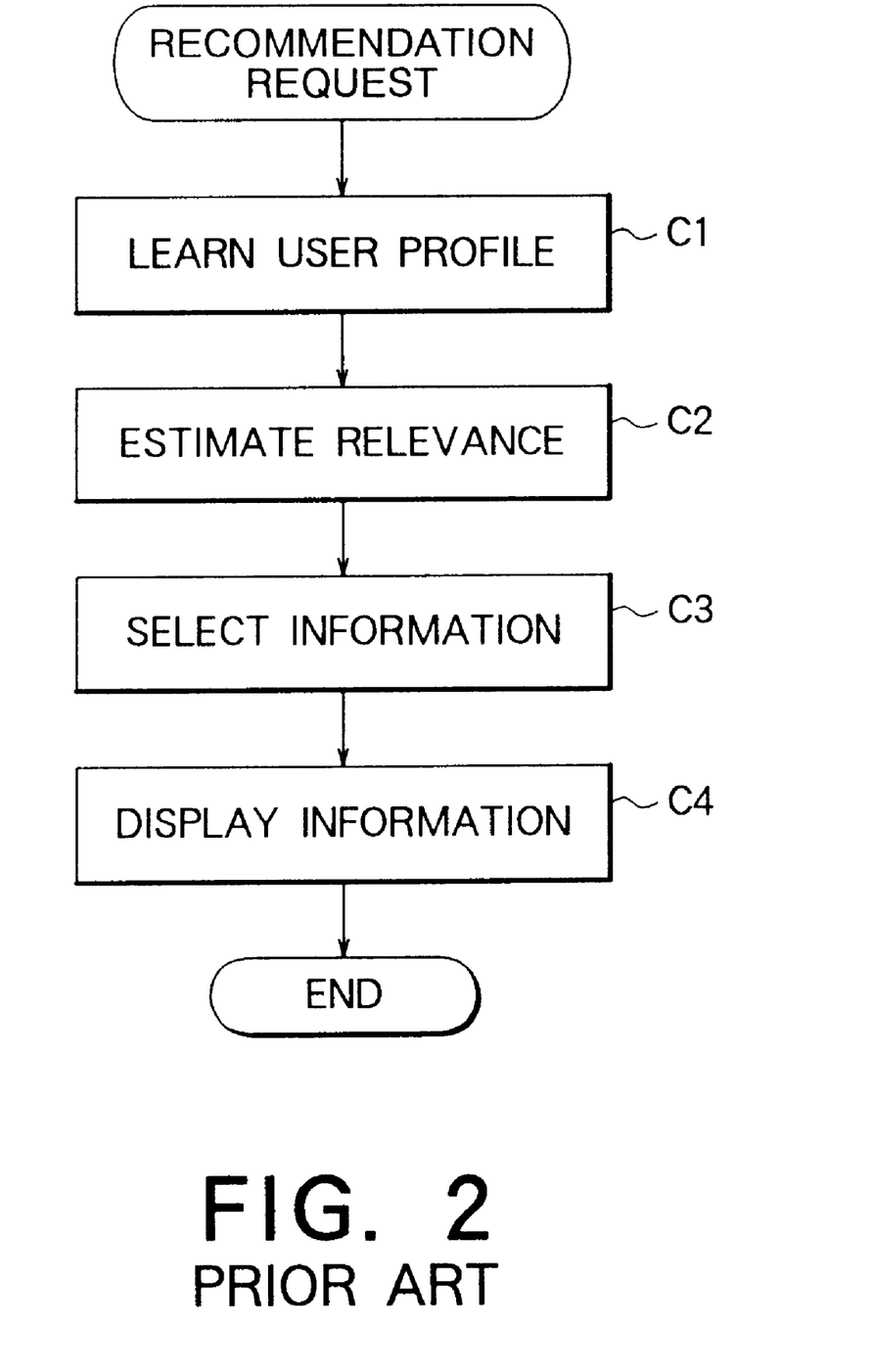
FIG. 2 is a flowchart showing an operation of the conventional CBF system.

First, the CBF system will be explained using FIGS. 1 and 2. Referring to FIG. 1, the CBF system comprises an input/output device 1, a data processing device 2 and a storage device 3.

The input/output device 1 comprises a request input section 11, an information display section 12 and a rating input section 13.

The storage device 3 comprises an information storing section 31, an attribute storing section 32 and a rating storing section 33. The information storing section 31 prestores recorded information 30. The rating storing section 33 stores values of ratings performed by users relative to items of information, respectively.

The data processing device 2 comprises an attribute extracting section 21, a user profile learning section 22, a relevance estimating section 23 and an information selecting section 24.

The attribute extracting section 21 extracts attributes, which can be features of the information items, from the information stored in the information storing section 31 and stores them in the attribute storing section 32 for the respective information items. As explained above, the attribute features the content of the information item in terms of keyword data or word frequency data. The attribute may be, for example, "A certain information item includes keywords of [baseball] and [soccer]." and thus is an extraction of a feature of the information item.

Upon receipt of a recommendation request of a subject user inputted through the request input section 11, the user profile learning section 22 learns a subject user profile based on the ratings of the information items performed by the subject user in the past and stored in the rating storing section 33 and the attributes of the information items already rated by the subject user among all the attributes of the information items stored in the attribute storing section 32. The subject user profile represents a relationship between the ratings by the subject user and the attributes of the information items and may be, for example, "A subject user gave a high rating in the past to an information item including a keyword of [baseball] while a low rating to an information item including a keyword of [soccer]". Accordingly, the subject user profile represents the interests of the subject user in terms of weights of the words (keywords) included in the information items.

The relevance estimating section 23 estimates a relevance to the subject user of each of the information items based on the subject user profile learned by the user profile learning section 22 and the attributes of the information items stored in the attribute storing section 32. Then, the information selecting section 24 uses the relevances estimated by the relevance estimating section 23 to select the information item suitable for the subject user from among the information items stored in the information storing section 31 and outputs it to the information display section 12. In this example, the relevance estimating section 23 receives the result of learning of the subject user profile that the subject user is interested in the information item having the attribute of [baseball] but not interested in the information item having the attribute of [soccer], and estimates that the information item having the keyword of [baseball] is suitable for the subject user. The information selecting section 24 receives the estimation result from the relevance estimating section 23, searches for the information items having the attribute of [baseball], selects one, which has not yet been rated by the subject user, from the information storing section 31, and outputs it to the information display section 12.

The subject user rates the information item displayed at the information display section 12 to determine whether it satisfies the subject user's request, and inputs a rating thereof through the rating input section 13. The inputted rating is stored in the rating storing section 33. Accordingly, the relevance feedback is carried out to increase the significance of words (keywords) contained in the information items in which the users are interested while reduce the significance of words contained in the information items in which the users are not interested. This makes it possible to carry out the information filtering which can further satisfy the user's interests.

Now, an operation of the conventional CBF system will be explained with reference to FIG. 2.

When a recommendation request is inputted from the request input section 11, the user profile learning section 22 learns a subject user profile, representing a relationship between the ratings by the subject user and the attributes of the information items, based on the rating history of the subject user stored in the rating storing section 33 and the attributes of the information items already rated by the subject user among all the attributes of the information items stored in the attribute storing section 32 (step C1). Subsequently, the relevance estimating section 23 estimates a relevance to the subject user of each of the information items based on the subject user profile learned by the user profile learning section 22 and the attributes of the information items stored in the attribute storing section 32 (step C2). Then, the information selecting section 24 uses the relevances estimated by the relevance estimating section 23 to select the information item matching with the subject user's request (step C3) and outputs it to the information display section 12 (step C4).

The subject user evaluates the information item displayed at the information display section 12 to determine whether it matches with the subject user's request, and inputs the rating result from the rating input section 13. The inputted rating data is stored in the rating storing section 33.

Accordingly, in the CBF system, the contents of the information items are featured by the attributes, such as the keywords or the frequencies of words contained in the respective information items, and the information filtering can be carried out based on comparison between the foregoing featured contents and the interests of the user shown in the past and represented by the weights of keywords or the like.

The foregoing example is simplified for brevity of explanation.

In practice, the profile learning may be carried out in the following manner:

It is assumed that feature vectors of the information items are considered as attribute values of the information items and that rating values of the information items are normalized between 1 and −1, wherein 1 represents that the user request is satisfied while −1 represents that the user request is not satisfied. In this case, the profile is given by the following equation (1):

$$\text{Profile} = \frac{\sum_k (R \times V)}{\sum_k R} \qquad (1)$$

wherein R represents a normalized rating value relative to a k-th information item, and V represents a feature vector of the k-th information item.

Depending on kinds of the information, the accuracy of profile may be increased by using a value, rather than an attribute value itself of an information item, obtained by dividing a deviation of the attribute value from a mean value of the attribute values by the standard deviation, as an element value of the feature vector.

Further, in some cases, the accuracy of profile may be increased by dividing the feature vectors by the absolute values thereof, respectively, so as to normalize lengths of the vectors to 1.

For the relevance estimation, the Pearson product-moment correlation coefficients between the feature vectors and the profile may be used.

Now, the SIF system will be explained using FIGS. 3 and 4. Explanation about structures having the same functions as the foregoing CBF system will be omitted.

Figure 3:
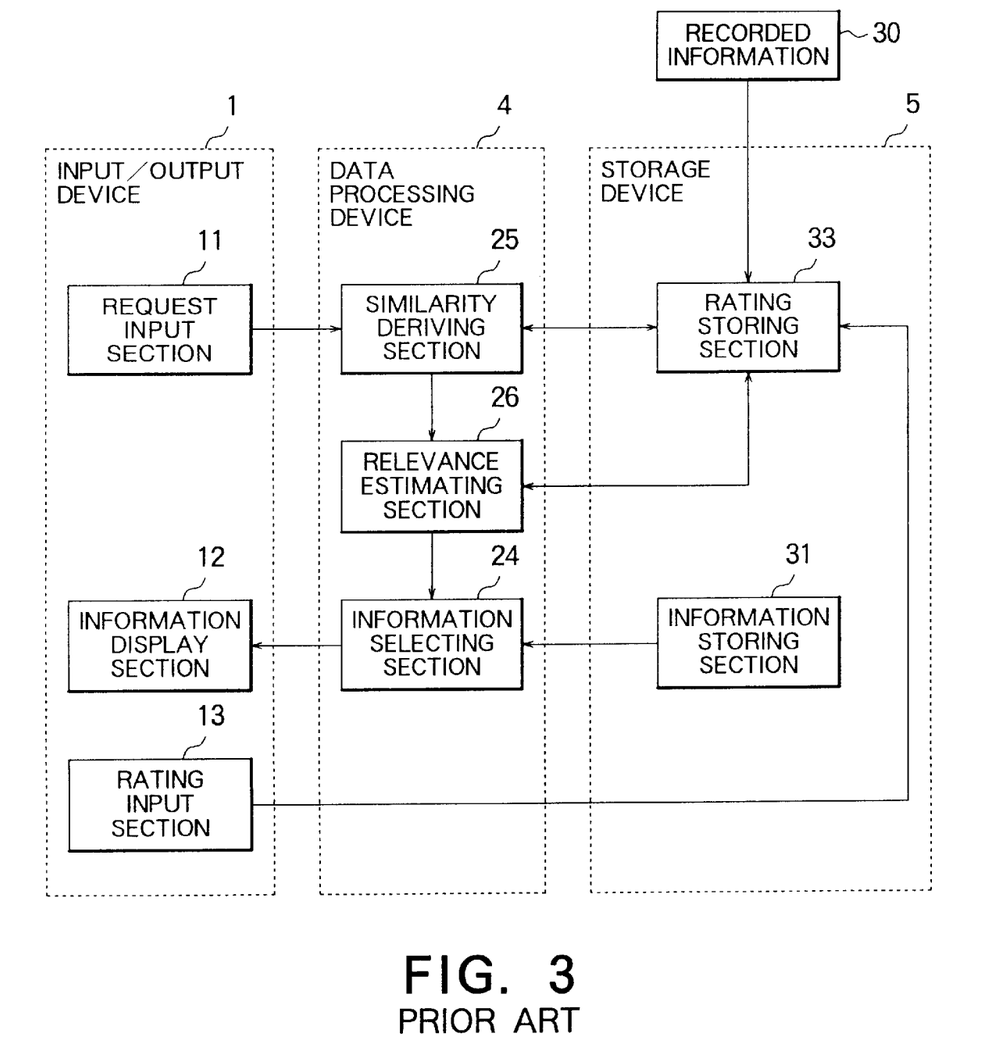
FIG. 3 is a block diagram showing a structure of a conventional SIF system.
Figure 4:
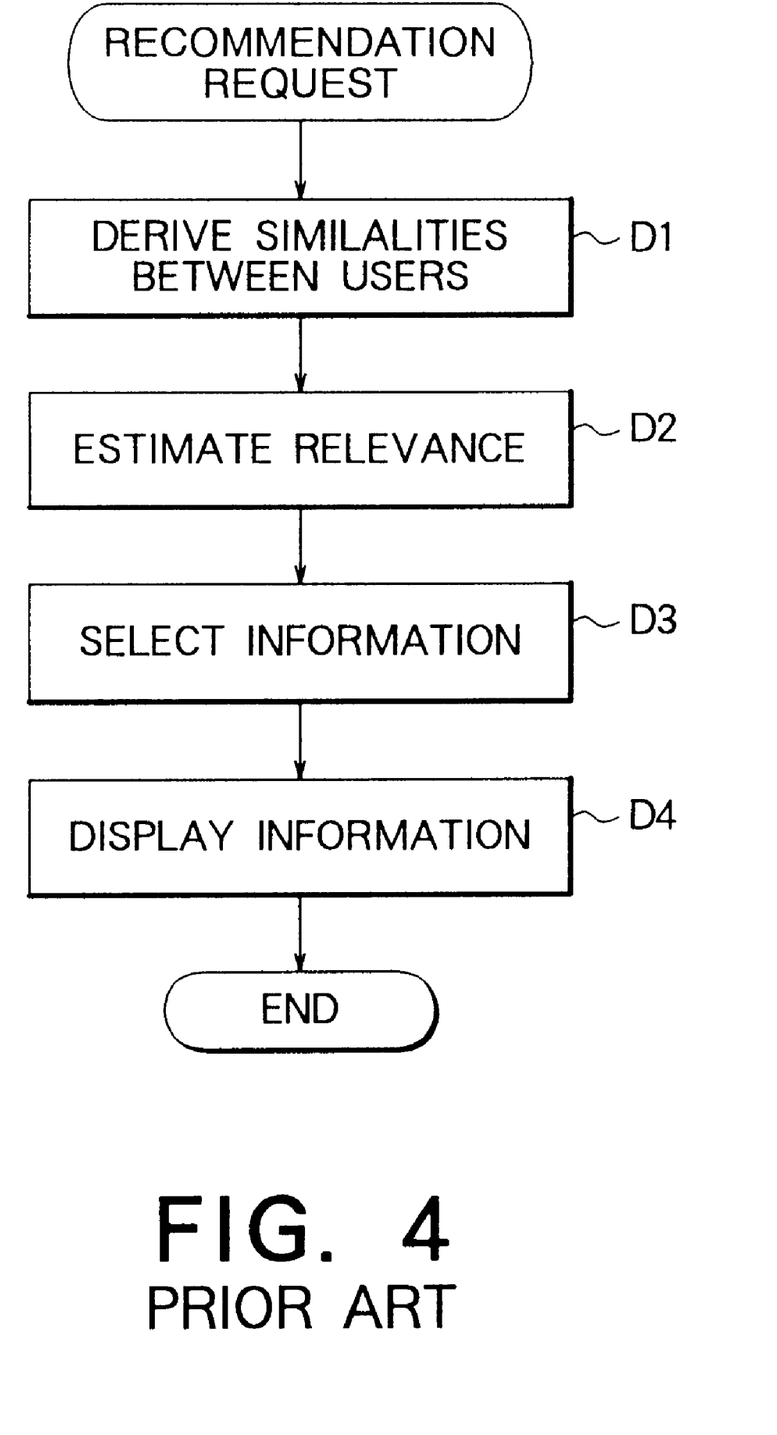
FIG. 4 is a flowchart showing an operation of-the conventional SIF system.

Referring to FIG. 3, the SIF system comprises an input/output device 1, a data processing device 4 and a storage device 5.

The input/output device 1 comprises a request input section 11, an information display section 12 and a rating input section 13.

The storage device 5 comprises an information storing section 31 and a rating storing section 33. The information storing section 31 prestores recorded information 30. The rating storing section 33 stores values of ratings which have been performed by the subject user and the users other than the subject user relative to items of information, respectively.

The data processing device 4 comprises a similarity deriving section 25, a relevance estimating section 26 and an information selecting section 24.

Upon receipt of a recommendation request of the subject user inputted through the request input section 11, the similarity deriving section 25 derives similarities between the users from a rating history of the subject user relative to the information items stored in the rating storing section 33 and rating histories of the users other than the subject user relative to the information items stored in the rating storing section 33, thereby to search out the user/users having similar taste with the subject user.

The relevance estimating section 26 estimates a relevance to the subject user of each of the information items based on the ratings stored in the rating storing section 33 and the similarities derived by the similarity deriving section 25. Then, the information selecting section 24 uses the relevances estimated by the relevance estimating section 26 to select the information item matching with the subject user's request from among the information items stored in the information storing section 31 and outputs it to the information display section 12. Specifically, the relevance estimating section 26 estimates the relevances of the information items from the similarities derived by the similarity deriving section 25 and, based on the estimated relevances, the information selecting section 24 selects the information item which has been evaluated high by the foregoing similar user/users, but not yet evaluated by the subject user, and outputs it to the information display section 12.

The subject user rates the information item displayed at the information display section 12 to determine whether it matches with the subject user's request, and inputs a rating thereof through the rating input section 13. The inputted rating is stored in the rating storing section 33.

The SIF system will be explained using an example. It is assumed that the information filtering is carried out for a subject user who is interested in [baseball] but not interested in [soccer]. In the SIF system, a user/users interested in [baseball] but not interested in [soccer] like the subject user are searched out, and the information item rated high by the searched-out user/users is offered to the subject user. Accordingly, if the searched-out user/users are interested in [fishing] in addition to [baseball], an information item including [fishing] is also offered. Naturally, it is preferable that the offered information item has not yet been seen by the subject user.

Now, an operation of the conventional SIF system will be explained with reference to FIG. 4.

When a recommendation request is inputted from the request input section 11, the similarity deriving section 25 uses the ratings stored in the rating storing section 33 to derive similarities between the users (step D1). For example, the foregoing GroupLens and Ringo use the Pearson product-moment correlation coefficients as the similarities between the users. Subsequently, the relevance estimating section 26 estimates a relevance to the subject user of each of the information items based on the ratings stored in the rating storing section 33 and the similarities derived by the similarity deriving section 25 (step D2). For example, the foregoing GroupLens estimates the relevance using the following equation (2):

$$\text{Relevance} = \frac{\sum_{k}(S \times R)}{\sum_{k} S} \quad (2)$$

wherein S represents a similarity between a subject user and a k-th user, and R represents a rating value by the k-th user.

Then, the information selecting section 24 uses the relevances estimated by the relevance estimating section 26 to select the information item matching with the subject user's request (step D3) and outputs it to the information display section 12 (step D4).

The subject user evaluates the information item displayed at the information display section 12 to determine whether it matches with the subject user's request, and inputs the rating result at the rating input section 13. The inputted rating data is stored in the rating storing section 33.

Accordingly, in the SIF system, the information filtering can be performed by comparing the ratings carried out by the subject user in the past and the ratings carried out by the users other than the subject user in the past so as to search out the user/users having similar taste with the subject user and selecting the information item which has been evaluated high by the foregoing similar user/users, but not yet seen by the subject user.

Now, a preferred embodiment of the present invention will be described in detail hereinbelow with reference to the drawing. Unless otherwise explained, those elements assigned the same reference signs in the figures are the same in function with each other throughout the foregoing prior art and the preferred embodiment of the present invention. Accordingly, explanation of those elements will be simplified or omitted for brevity of disclosure unless further explanation seems necessary.

Figure 5:
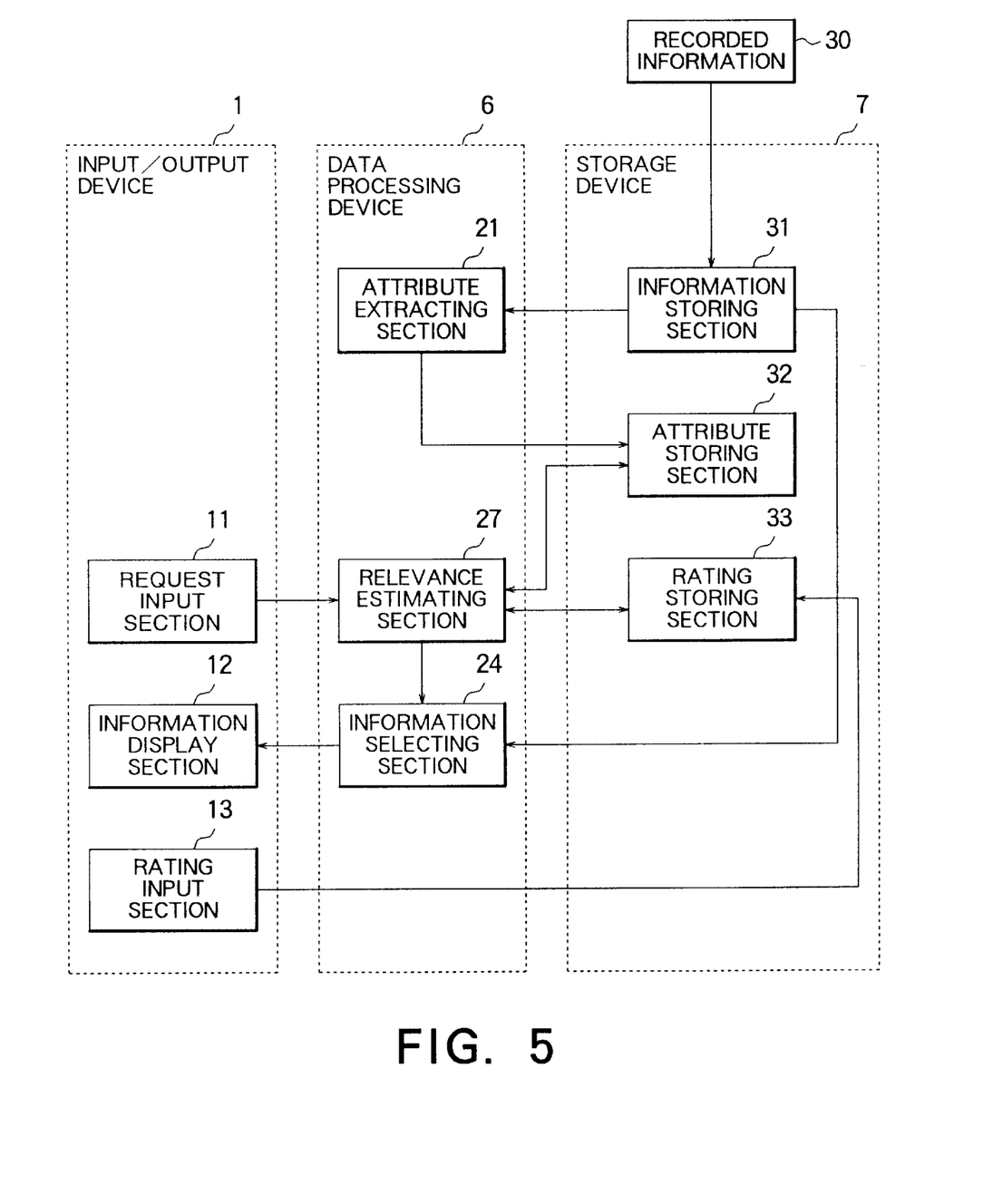
FIG. 5 is a block diagram showing an information filtering device according to a preferred embodiment of the present invention.

FIG. 5 shows an information filtering device according to the preferred embodiment of the present invention. The information filtering device comprises an input/output device 1, a data processing device 6 and a storage device 7.

The input/output device 1 comprises a request input section 11, an information display section 12 and a rating input section 13.

The storage device 7 comprises an information storing section 31, an attribute storing section 32 and a rating storing section 33. The information storing section 31 prestores recorded information 30. The rating storing section 33 stores values of ratings performed by a subject user and users other than the subject user relative to items of information, respectively.

The data processing device 6 comprises an attribute extracting section 21, a relevance estimating section 27 and an information selecting section 24.

The attribute extracting section 21 extracts attributes, such as keywords, which can be features of the information items, from the information stored in the information storing section 31 and stores them in the attribute storing section 32 for the respective information items.

Figure 9:
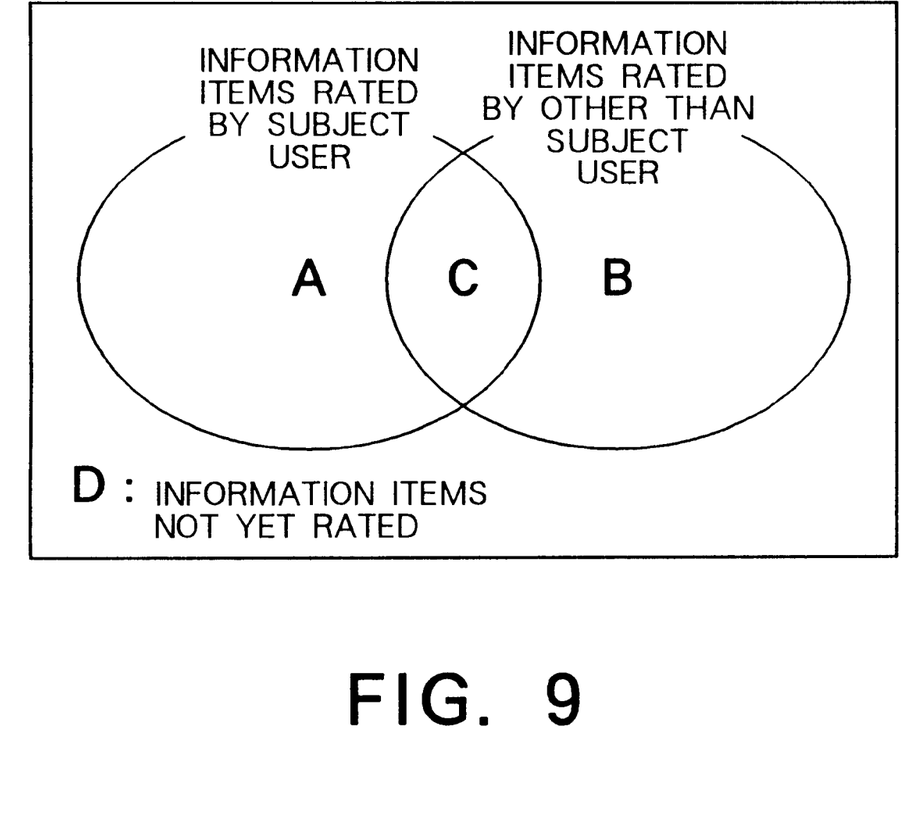
FIG. 9 is a diagram for explaining information processed by the information filtering according to the preferred embodiment of the present invention.

Upon receipt of a recommendation request of the subject user inputted through the request input section 11, the relevance estimating section 27 uses the ratings of the information items performed by the subject user and the users other than the subject user (that is, the information items C in FIG. 9) and stored in the rating storing section 33 so as to derive similarities between the users, and then first derives relevances of the information items B in FIG. 9 to perform the information filtering thereof.

Subsequently, the information filtering of the information items D in FIG. 9 is carried out. In the conventional CBF system, the information filtering of the information items D is carried out by learning, at the user profile learning section 22 in FIG. 1, the relationship between the attributes of the information items (A+C) and the ratings thereof performed by the subject user. On the other hand, in this embodiment, the result of the information filtering relative to the information items B is also utilized so that a relationship between the attributes of the filtered-in information items B and the relevances thereof to the subject user is also learned. In this specification, the relevance and the rating have the same meaning. However, they are distinguished therebetween such that the rating is inputted by the user while the relevance represents a degree of matching to the subject user estimated through calculation. Accordingly, the information filtering of the information items D is carried out by learning the relationship between the attributes of the information items among the information items (A+B+C) and the ratings (or relevances) thereof.

The information selecting section 24 outputs the result of the information filtering by the relevance estimating section 27 to the information display section 12. The subject user evaluates the information item displayed at the information display section 12 to determine whether it matches with the subject user's request, and inputs a rating thereof through the rating input section 13. The inputted rating is stored in the rating storing section 33.

Figure 6:
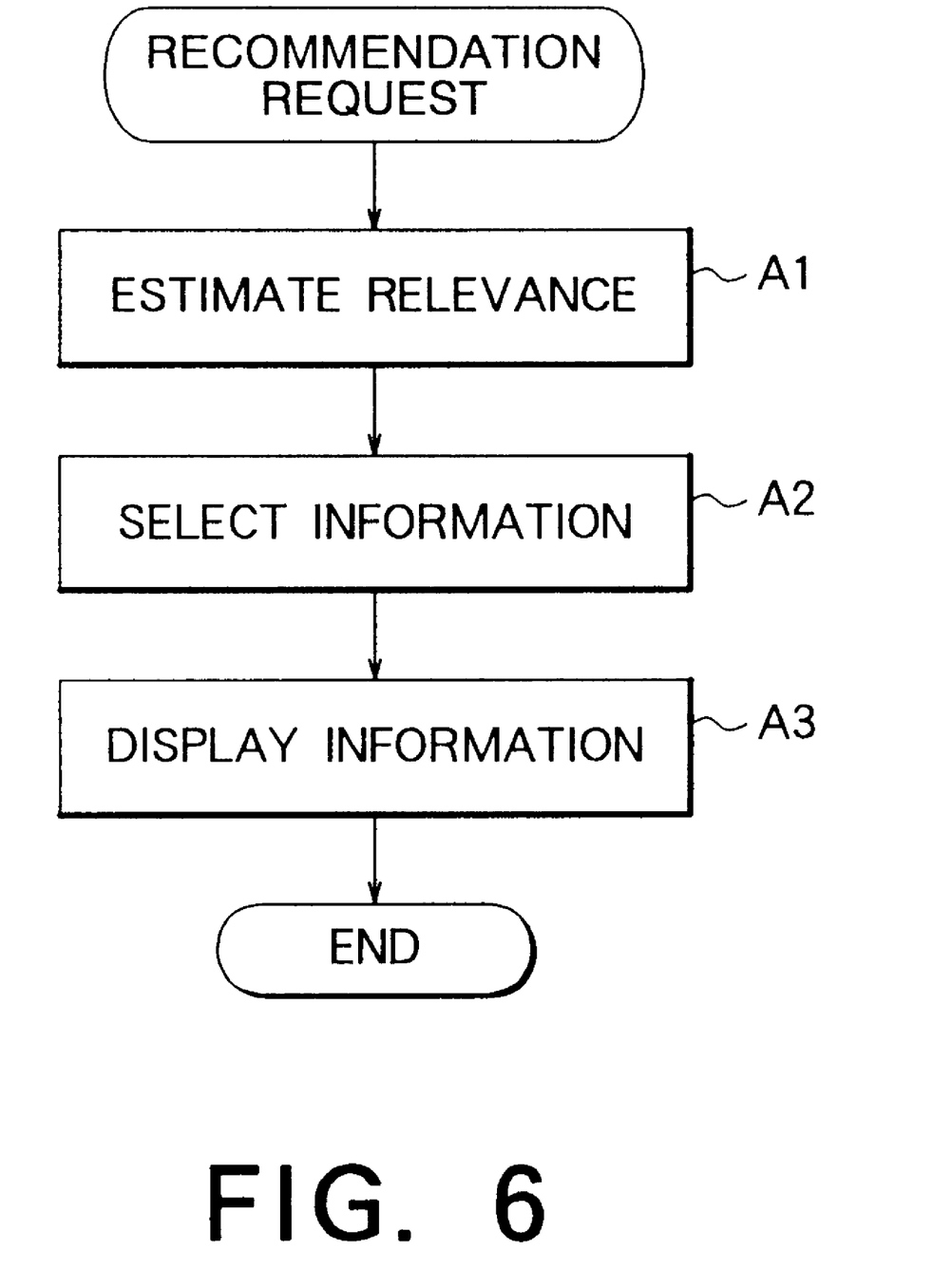
FIG. 6 is a flowchart showing an operation of the information filtering device shown in FIG. 5.

Now, referring to FIG. 6, an operation of the information filtering device shown in FIG. 5 will be described.

Upon receipt of a recommendation request of the subject user from the request input section 11, the relevance estimating section 27 uses the ratings of the subject user and the users other than the subject user stored in the rating storing section 33 and the attributes of the information items stored in the attribute storing section 32 to analyze the relationship between the values of the ratings by the users and the attributes of the information items, and estimates the relevances to the subject user of the information items (step A1). The information selecting section 24 uses the relevances estimated by the relevance estimating section 27 to select the information item matching with the subject user's request (step A2) and outputs it to the information display section 12 (step A3). The information selecting section 24 is referred to as a carrying out arrangement.

Now, the relevance estimating section 27 will be described in more detail.

Figure 7:
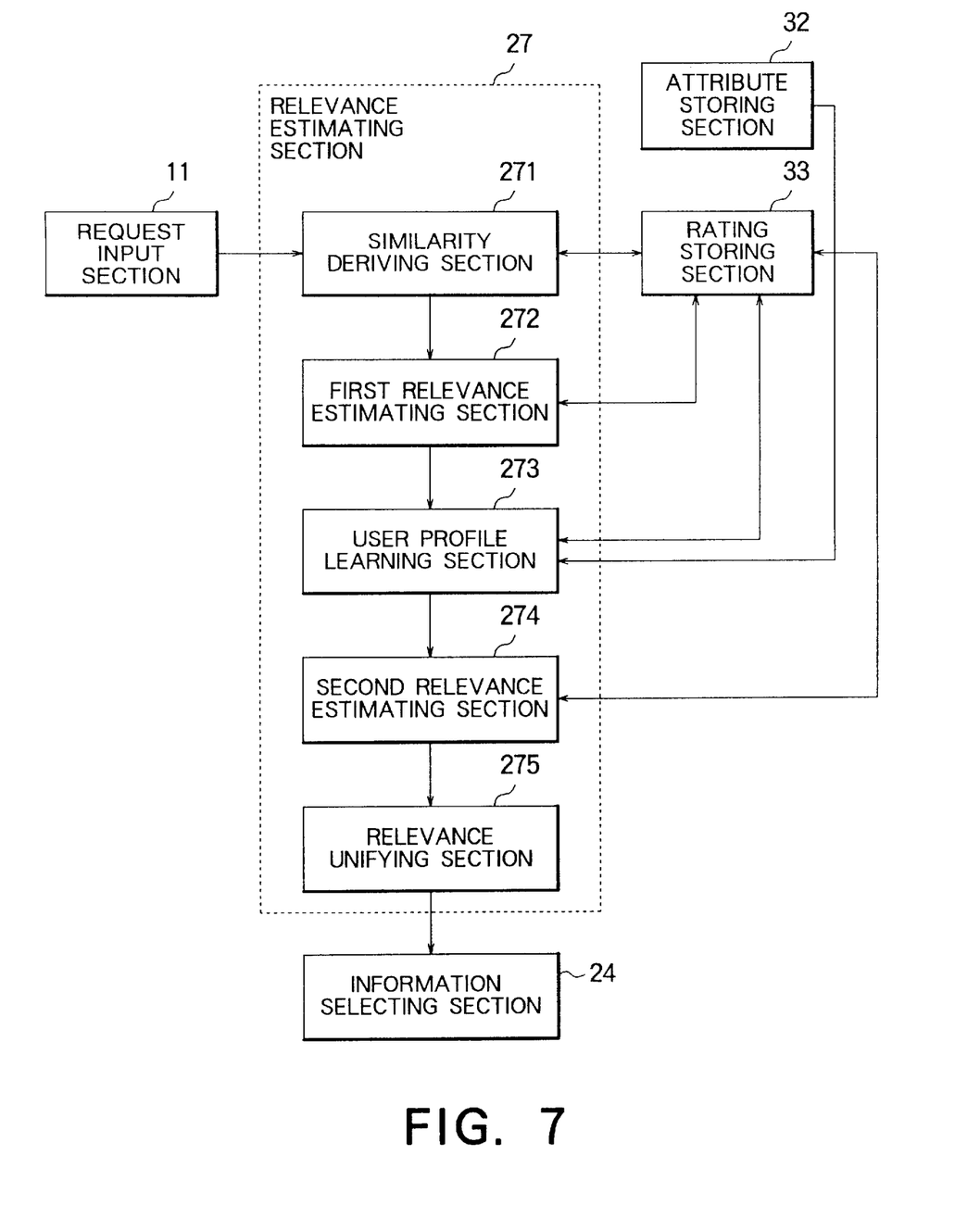
FIG. 7 is a block diagram showing in detail a relevance estimating means of the information filtering device shown in FIG. 5.

In FIG. 7, the relevance estimating section 27 comprises a similarity deriving section 271, a first relevance estimating section 272, a user profile learning section 273, a second relevance estimating section 274 and a relevance unifying section 275.

Upon receipt of a recommendation request of the subject user from the request input section 11, the similarity deriving section 271 uses the ratings of the information items carried out by the subject user and the users other than the subject user and stored in the rating storing section 33 to derive the similarities between the users.

From the ratings of the users other than the subject user stored in the rating storing section 33 and the similarities between the users derived by the similarity deriving section 271, the first relevance estimating section 272 estimates the relevances to the subject user of the information items B in FIG. 9.

From the attributes of the information items stored in the attribute storing section 32, the ratings of the subject user stored in the rating storing section 33 and the relevances estimated by the first relevance estimating section 272, the user profile learning section 273 learns a profile representing the relationship between the attributes of the information items and the ratings of the subject user and further learns a profile representing the relationship between the attributes of the information items and the relevances to the subject user. The profile represents the user's interest in terms of weights or the like of keywords or the like.

Further, the profile representing the relationship between the attributes of the information items and the ratings of the subject user represents a relationship about how the subject user rated in the past the information items having certain attributes. For example, it represents a relationship between the attribute and the subject user, such as "A subject user gave in the past a high rating to an information item including a keyword of [baseball].".

On the other hand, the profile representing the relationship between the attributes of the information items and the relevances to the subject user represents a relationship between the attributes and the relevances to the subject user, and is obtained by referring to the attribute storing section 32 based on the relevances of the respective information items to the subject user estimated by the first relevance estimating section 272.

For example, it is assumed that the subject user has given a high rating to an information item including a keyword of [baseball]. In this case, those information items are searched out, which are included in the information items B in FIG. 9 (as described before, the information items B have not been rated by the subject user, but rated by the users other than the subject user) and have been rated by the users other than the subject user who have given high ratings to the information items including the keyword of [baseball] like the subject user, Then, the attributes included in the searched-out information items are extracted. For example, if the users having similar taste with the subject user have evaluated high information items including a keyword of [fishing] in addition to the information items including the keyword of [baseball], a profile is learned which represents a relationship between attributes and relevances to the subject user, such as "A relevance to a subject user may be high with respect to an information item including a keyword of [fishing] in addition to an information item including a keyword of [baseball].".

Subsequently, from the attributes of the information items stored in the attribute storing section 32 and the profile of the subject user learned by the user profile learning section 273, the second relevance estimating section 274 derives the relevances to the subject user of the information items D in FIG. 9 (as described before, the information items D have not been rated by the users) and notifies them to the relevance unifying section 275. Specifically, in the foregoing example, among the information items D, the relevances are derived to be high for the information items including the keyword of [baseball], and similarly, the relevances are derived to be high for the information items including the keyword of [fishing].

It may also be arranged that the second relevance estimating section 274 estimates the relevances of, in addition to the information items D, the information items which have been evaluated by a small number of the users.

The relevance unifying section 275 unifies the relevances derived by the first relevance estimating section 272 and the second relevance estimating section 274 for notification to the information selecting section 24.

Figure 8:
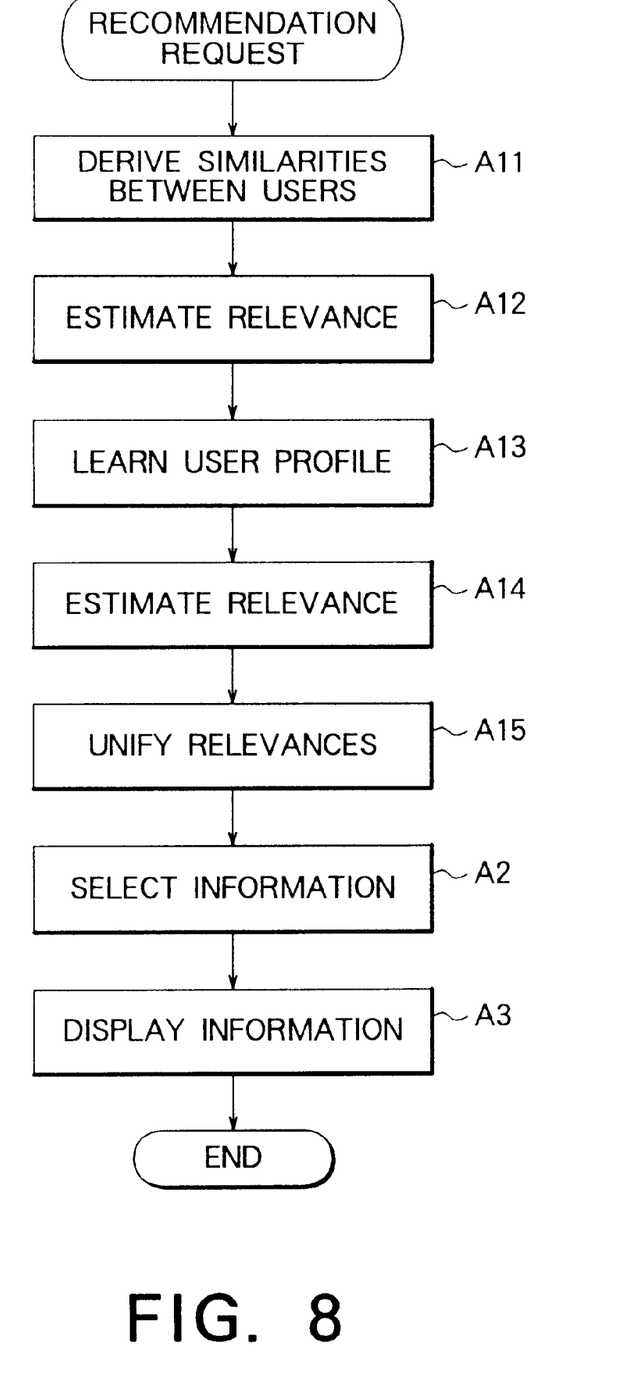
FIG. 8 is a flowchart showing the operation of the information filtering device in more detail according to the structure shown in FIG. 7.

Now, referring to FIG. 8, the operation of the information filtering device will be described in more detail according to the structure of FIG. 7.

Upon receipt of a recommendation request of the subject user from the request input section 11, the similarity deriving section 271 uses the ratings of the subject user and the users other than the subject user stored in the rating storing section 33 to derive the similarities between the users (step A11). From the ratings of the users other than the subject user stored in the rating storing section 33 and the similarities between the users derived by the similarity deriving section 271, the first relevance estimating section 272 estimates the relevances to the subject user of the respective information items (step A12).

From the attributes of the information items stored in the attribute storing section 32, the ratings of the subject user stored in the rating storing section 33 and the relevances estimated by the first relevance estimating section 272, the user profile learning section 273 learns the profile representing the relationship between the attributes of the information items and the ratings of the subject user and the profile representing the relationship between the attributes of the information items and the relevances to the subject user (step A13).

From the attributes of the information items stored in the attribute storing section 32 and the profiles of the subject user learned by the user profile learning section 273, the second relevance estimating section 274 estimates the relevances of the information items D relative to the subject user and notifies them to the relevance unifying section 275 (step A14). In this case, in addition to the information items D, the relevances to the subject user may be estimated for the information items which have been rated by a small number of the users.

The relevance unifying section 275 unifies the relevances from the first relevance estimating section 272 and the second relevance estimating section 274 and notifies the unified relevance to the information selecting section 24. The relevance notifying section 275 unifies the relevances when the first and second relevance estimating section 272, 274 estimate different relevances for the same information item (step A15).

The information selecting section 24 uses the unified relevances from the relevance unifying section to select the information item matching with the subject user's request (step A2) and outputs it to the information display section 12 (step A3).

The similarity between the users may be the same as in the conventional SIF system. For example, a vector having, as elements, values of ratings performed by a user relative to information items may be used as a rating vector, and a Pearson product-moment correlation coefficient between rating vectors of the users may be used as a similarity between the users.

The profile learning method may be the same as in the conventional CBF system. However, although the relationship between the attributes of the information items and the ratings thereof is learned in the conventional CBF system, the relationship between the attributes of the information items and the rating values thereof and the relationship between the attributes of the information items and the relevances estimated by the first relevance estimating section are learned in this embodiment. For example, the profile can be derived by the following equation (3):

$$\text{Profile} = \frac{\sum_k (R \times V)}{\sum_k R} \quad (3)$$

wherein R represents a normalized rating value or estimated relevance relative to a k-th information item, and V represents a feature vector of the k-th information item, and wherein "rating value or estimated relevance" represents that a rating value is used when there is rating, while an estimated relevance is used when there is no rating.

The estimating method of the relevance used by the second relevance estimating section may be the same as in the conventional CBF system. For example, a Pearson product-moment correlation coefficient between a feature vector of an information item and a profile may be used.

The second relevance estimating section estimates the relevance of the information item whose relevance can not be estimated by the first relevance estimating section or whose relevance is low in accuracy even if it can be estimated. For example, as described before, the relevance is estimated for the information item which has not been rated by any of the users or which has been rated by a small number of the users.

As described before, when the first and second relevance estimating section 272 and 274 estimate different relevances for the same information item, the relevance unifying section 275 unifies the relevances. In this case, the relevance unifying section 275 may select the higher relevance or the lower relevance, use the mean value of the two relevances, select one of the two relevances with higher reliability, or carry out others, depending on a field of the information so as to maximize the reliability of the unified relevance.

Further, a storage medium, such as a CD-ROM or a flexible disk, may store a program which is executable by a computer so that the operation of the information filtering device according to this embodiment is realized when the computer executes the stored program.

Referring to FIG. 9, the description will be proceeded as regards the effects of the information filtering device. Since the SIF system has the foregoing feature, the SIF system is used with respect to the information items B. On the other hand, with respect to the information items D, since only the CBF system deals with the information filtering of such information items, the CBF system is used. However, as described before, the CBF system has the problem of being poor at dealing with the unknown word. Such a problem is coped with by feeding back the filtering result of the SIF system to the profile of the CBF system. Accordingly, the present invention can achieve the information filtering even relative to the information items D and is better at dealing with the unknown word than the conventional CBF system by using the ratings of the users other than the subject user.

The present invention will be understood more fully from the detailed description given hereinbelow, taken in conjunction with the accompanying drawings.

According to the foregoing preferred embodiment, the following effects can be achieved:

The first effect is to lessen the problem that it is necessary for the user to judge in the conventional CBF system whether the information is valuable or not, by reading it. The reason is that the personal evaluation of the information is introduced into the relevance estimation.

The second effect is to lessen the problem that the filtering accuracy is low in the conventional CBF system relative to an information item having an unknown word or an unknown attribute value. The reason is that even if the word or attribute value is not included in the information item rated by the subject user, it can be used for the relevance estimation if it is included in an information item rated by the other user.

The third effect is to solve the problems of the conventional SIF system that only the information item that has been recommended or evaluated by the users can be obtained and that the filtering accuracy is low unless a certain number of ratings have been collected. The reason is that the relevance estimation is carried out using also the attributes of the information items.

While the present invention has been described in terms of the preferred embodiment, the invention is not to be limited thereto, but can be embodied in various ways without departing from the principle of the invention as defined in the appended claims.

What is claimed is:

1. An information filtering method comprising the steps of:
 obtaining attributes included in information items;
 obtaining ratings relative to said information items performed by users including a subject user and other users;
 estimating relevances to said subject user of the information items not rated by said subject user by the use of the ratings relative to the information items rated by said subject user, of the attributes of the information items rated by said subject user, of the ratings relative to the information items rated by said other users, and of the attributes of the information items rated by said other users; and carrying out recommendation or filtering-in for said subject user of said information items by the use of said relevances.

2. An information filtering method as claimed in claim 1, wherein the estimating step comprises the steps of:

deriving a first relationship between the ratings relative to the information items rated by said subject user and the attributes of the information items rated by said subject user;

deriving a second relationship between the ratings relative to the information items rated by said other users and the attributes of the information items rated by said other users; and estimating the relevances to said subject user of the information items not rated by said subject user by the use of said first and said second relationships.

3. An information filtering method as claimed in claim 1, wherein the estimating step comprises the steps of:

deriving similarities between said subject user and said other users by the use of the ratings relative to the information items rated by said subject user and of the ratings relative to the information items rated by said other users;

estimating, based on said similarities, a first relevance to said subject user of the information items not rated by said subject user among the information items rated by said other users;

deriving a first relationship between the ratings relative to the information items rated by said subject user and the attributes of the information items rated by said subject user;

deriving a second relationship between said first relevance and the attributes of the information items not rated by the subject user among the information items rated by said other users;

estimating, based on said first and said second relationships, a second relevance to said subject user of the information items not rated by any of said subject user and said other users; and unifying said first and said second relevances into the first-mentioned relevances, respectively.

4. An information filtering method as claimed in claim 1, wherein the first-mentioned obtaining step comprises the steps of:

extracting said attributes from said information items; and storing said attributes in an attribute storing section, the second-mentioned obtaining step comprising:

receiving said ratings from said users; and storing said ratings in a rating storing section.

5. An information filtering device comprising:

first obtaining means for obtaining attributes included in information items;

second obtaining means for obtaining ratings relative to said information items performed by users including a subject user and other users;

estimating means connected to said first and said second obtaining means for estimating relevances to said subject user of the information items not rated by said subject user by the use of the ratings relative to the information items rated by said subject user, of the attributes of the information items rated by said subject user, of the ratings relative to the information items rated by said other users, and of the attributes of the information items rated by said other users; and carrying out means connected to said estimating means for carrying out recommendation or filtering-in for said subject user of said information items by the use of said relevances.

6. An information filtering device as claimed in claim 5, wherein the estimating means comprises:

first deriving means connected to said first and said second obtaining means for deriving a first relationship between the ratings relative to the information items rated by said subject user and the attributes of the information items rated by said subject user;

second deriving means connected to said first and said second obtaining means for deriving a second relationship between the ratings relative to the information items rated by said other users and the attributes of the information items rated by said other users; and local estimating means connected to said first and said second deriving means and said carrying out means for estimating the relevances to said subject user of the information items not rated by said subject user by the use of said first and said second relationships.

7. An information filtering device as claimed in claim 5, wherein the estimating means comprises:

zeroth deriving means connected to said first and said second obtaining means for deriving similarities between said subject user and said other users by the use of the ratings relative to the information items rated by said subject user and of the ratings relative to the information items rated by said other users;

first local estimating means connected to said zeroth deriving means for estimating, based on said similarities, a first relevance to said subject user of the information items not rated by said subject user among the information items rated by said other users;

first deriving means connected to said first and said second obtaining means for deriving a first relationship between the ratings relative to the information items rated by said subject user and the attributes of the information items rated by said subject user;

second deriving means connected to said first and said second obtaining means for deriving a second relationship between said first relevance and the attributes of the information items not rated by the subject user among the information items rated by said other users;

second local estimating means connected to said first and said second deriving means for estimating, based on said first and said second relationships, a second relevance to said subject user of the information items not rated by any of said subject user and said other users; and unifying means connected to said first and said second local estimating means for unifying said first and said second relevances into the first-mentioned relevances, respectively.

8. An information filtering device as claimed in claim 5, wherein said first obtaining means comprises:

extracting means for extracting said attributes from said information items; and an attribute storing section connected to said extracting means and said estimating means for storing said attributes therein, said second obtaining means comprising:

receiving means for receiving said ratings from said users; and a rating storing section connected to said receiving means and said estimating means for storing said ratings therein.

9. A storage medium storing an information filtering program which is executable by a computer, said program allowing said computer to execute the steps of:

extracting attributes included in information items and storing said attributes in a storage device of the computer, and storing ratings relative to the information items performed by users including a subject user and other users in said storage device;

using a relationship between the ratings relative to the information items rated by the subject user and the attributes thereof and a relationship between the ratings relative to the information items rated by the other users and the attributes thereof so as to estimate relevances to the subject user of the information items not rated by the subject user; and using said relevances to carry out recommendation or filtering-in of the information item matching with the subject user.

10. A storage medium storing an information filtering program which is executable by a computer, said program allowing said computer to function as:

attribute extracting means for extracting attributes included in information items;

attribute storing means for storing said extracted attributes;

rating storing means for receiving inputs of rating values relative to the information items from users including a subject user and other users, and storing said received rating values;

similarity deriving means for deriving, by referring to said rating storing means, similarities between the subject user and the other users based on the rating values inputted by the subject user relative to the information items and the rating values inputted by the other users relative to the information items;

first relevance estimating means for estimating, based on said derived similarities, first relevances to the subject user of the information items not rated by the subject user among the information items rated by the other users; a user profile learning means for learning, by referring to said attribute storing means and said rating storing means, a relationship between the attributes included in the information items rated by the subject user and the ratings thereof, and further learning, based on said estimated first relevances, a relationship between the attributes included in the information items not rated by the subject user among the information items rated by the other users and the relevances thereof to the subject user;

second relevance estimating means for estimating, based on said relationship between the attributes and the ratings and said relationship between the attributes and the relevances, second relevances to the subject user of the information items not rated by any of the subject user and the other users; and relevance unifying means for unifying said first and second relevances to carry out recommendation or filtering-in of the information item matching with the subject user.

* * * * *